(12) United States Patent
Yin et al.

(10) Patent No.: US 8,745,316 B2
(45) Date of Patent: Jun. 3, 2014

(54) SYSTEM AND METHOD OF MANAGING INDEXATION OF FLASH MEMORY

(75) Inventors: Shaoyi Yin, Peking (CN); Philippe Pucheral, Valenton (FR)

(73) Assignee: Gemalto SA, Meudon (FR)

( * ) Notice: Subject to any disclaimer, the term of this patent is extended or adjusted under 35 U.S.C. 154(b) by 945 days.

(21) Appl. No.: 12/598,789

(22) PCT Filed: Apr. 25, 2008

(86) PCT No.: PCT/EP2008/055057
§ 371 (c)(1),
(2), (4) Date: Apr. 19, 2010

(87) PCT Pub. No.: WO2008/135412
PCT Pub. Date: Nov. 13, 2008

(65) Prior Publication Data
US 2010/0199027 A1    Aug. 5, 2010

(30) Foreign Application Priority Data
May 4, 2007  (EP) .................................... 07290567

(51) Int. Cl.
*G06F 12/00* (2006.01)
*G06F 13/00* (2006.01)
*G06F 13/28* (2006.01)
*G06F 7/00* (2006.01)
*G06F 17/30* (2006.01)

(52) U.S. Cl.
USPC ........... 711/103; 707/711; 707/715; 707/741; 707/747; 707/830

(58) Field of Classification Search
USPC ........... 711/103; 707/711, 715, 741, 747, 830
See application file for complete search history.

(56) References Cited

U.S. PATENT DOCUMENTS

| | | | | |
|---|---|---|---|---|
| 5,897,637 A | * | 4/1999 | Guha | .................................... 1/1 |
| 6,292,880 B1 | * | 9/2001 | Mattis et al. | .................. 711/216 |
| 6,763,347 B1 | * | 7/2004 | Zhang | ........................... 711/117 |

FOREIGN PATENT DOCUMENTS

WO    WO 00/54184 A    9/2000

OTHER PUBLICATIONS

"PBFilter: Indexing flash-Resident Data through Partitioned Summaries", Shaoyi Yin, Philippe Pucheral, Xiaofeng Meng, Inria, CIKM Oct. 26-30, 2008, http://hal.archives-ouvertes.fr/docs/00/28/43/59/PDF/PBFilter_rr.pdf.*
"BloomFlash: Bloom Filter on Flash-based Storage", Biplob Debnath, Sudipta Sengupta, Jin Li, David J. Lilja, David H.C. Du ICDCS Jun. 20-24, 2011, http://ieeexplore.ieee.org/stamp/stamp.jsp?tp=&arnumber=5961740.*

(Continued)

*Primary Examiner* — Michael Alsip
(74) *Attorney, Agent, or Firm* — Buchanan Ingersoll & Rooney PC (57) ABSTRACT

The invention is a system of managing indexation of memory. Said system has a microprocessor, and a flash memory. Said flash memory has an indexed area comprising indexed items, and an index that is structured in a plurality of index areas comprising a plurality of entries. Said flash memory comprises an index summary comprising a plurality of elements. Each index summary element is linked to an index area of said index. Each index summary element is built from all entries belonging to said linked index area and is built using k hash functions, with 1≤k.

20 Claims, 4 Drawing Sheets

(56) References Cited

OTHER PUBLICATIONS

"BloomStore: Bloom-Filter based memory-efficient key-value store for indexing of data deduplication on flash", Guanlin Lu, Young Jin Nam, David H.C. Du, MSST Apr. 16-20, 2012 http://ieeexplore.ieee.org/stamp/stamp.jsp?tp=&arnumber=6232390.*

International Search Report (PCT/ISA/210) for PCT/EP2008/055057 mailed Jul. 28, 2008.

Written Opinion (PCT/ISA/237) for PCT/EP2008/055057 mailed Jul. 28, 2008.

S. Lin et al., "Efficient Indexing Data Structures for Flash-Based Sensor Devices", ACM Transactions on Storage, Nov. 2006, pp. 468-503, vol. 2, No. 4, New York, NY, USA.

C. Wu et al., "An Efficient B-Tree Layer for Flash-Memory Storage Systems", Real-Time and Embedded Computing Systems and Applications Lecture Notes in Computer Science, 2004, pp. 409-430, vol. 2968, Springer-Verlag, Berlin, Germany.

A. Yoo et al., A New Index Structure for Flash Memory Resident Data, International Conference on Computer and Their Application, Proceedings of ISCA CATA, Mar. 25, 1998, pp. 364-367.

P. Almeida et al., "Scalable Bloom Filters", Information Processing Letters, Jan. 16, 2007, pp. 255-261, vol. 101, No. 6, Amsterdam, Netherlands.

* cited by examiner

SYSTEM AND METHOD OF MANAGING INDEXATION OF FLASH MEMORY

FIELD OF THE INVENTION

The present invention relates to system and methods of managing indexation of flash memory. It relates particularly to systems and methods of indexation of items in a flash memory like NAND flash memory.

PRIOR ART

The indexation mechanism used with a flash memory must comply with constraints specific to this kind of memory. For example NAND Flash memory component have the following characteristics. A NAND Flash is divided into blocks. Each block is divided into pages, typically in 64 pages. Each page is usually divided into sectors, typically in 4 sectors. Rewriting a page in place imposes erasing first the complete block containing it. The cost to read a page is decomposed into the cost to load the page from the flash memory to a data register (roughly 25 µs) plus the cost to load data from the data register to the RAM (roughly 50 ns/byte). The cost to write a page is roughly ten times higher than the cost to read a page. A page can be programmed/erased a limited number of time, typically 100,000 times.

There are two main known indexation technique families, namely hash-based and tree-based. Little attention has been paid to hash-based techniques in the flash memory context. The reason for this is that hashing performs well only when the number of buckets can be made high and when the RAM can accommodate one buffer per bucket. This incurs a high RAM consumption while RAM is usually a scarce resource in flash-based devices.

In the tree-based family, the most studied indexing structure is the B+Tree. A B+Tree is a type of tree which represents sorted data in a way that allows for efficient insertion, retrieval and removal of records, each of which is identified by a key. A B+Tree is a dynamic, multilevel index, with maximum and minimum bounds on the number of keys in each index segment, usually called a node. In a B+Tree, all records are stored at the lowest level of the tree. Only keys are stored in interior blocks. Regular B+Tree techniques may be built on top of a Flash Translation Layer (FTL). Each time a new record is inserted in a file, its associated key must be added to a B+Tree node, incurring an update of the flash page containing this node and then a copy of this page elsewhere in the flash because there is no update in the same place. Such a copy is time consuming and increases the number of write operations performed on the flash memory. Besides such a copy increases the page number required in flash and the cost of obsolete pages recovering is important. To avoid these repetitive updates a known optimization is to use a large buffer allocated in RAM.

Moreover, key insertions are slow down because the B+Tree must be traversed to determine the node targeted by the insertion.

SUMMARY OF THE INVENTION

The invention aims at minimizing the RAM consumption required by the memory indexation method and system.

The object of the present invention is a system of managing indexation of memory. Said system has a microprocessor and a flash memory. Said flash memory comprises an indexed area comprising indexed items, and an index structured in a plurality of index areas comprising a plurality of entries. Said flash memory comprises an index summary comprising a plurality of elements. Each index summary element is linked to an index area of said index. Each index summary element is built from all entries belonging to said linked index area and is built using k hash functions, with $1 \le k$.

Each index summary element may be a Bloom filter.

The flash memory may be a NAND flash memory.

Each element of the index summary may comprise m bits, with $m > 0$, and the index summary may be split into a first group of P partitions with $1 \le P \le m$, so that the consecutive bits $E(((i-1) \times (m/p))+1)$ to $E(i \times (m/p))$ of every elements of the index summary belong to the $i^{th}$ partition, with $1 \le i \le m$ and where $E(n)$ is the higher integer $\le n$.

Each partition may be recorded in a set of memory pages, said set being exclusively allocated to said partition.

Each index summary element may comprise a set of q buckets of bits, with $q \ge P$, where only bits belonging to a selected bucket are significant. The selected bucket may be identified by the result of a hash function h0 applied to all entries belonging to the index area linked to said element.

Indexed items and entries may be recorded in a sequential way respectively in the indexed area and in the index. The flash memory may has a delete area comprising a set of identifiers of the deleted indexed items.

Each indexed item may be a file record. Said system may be an electronic token such as a smart card.

Another object of the invention is a method of managing indexation of memory in a system, said system having a microprocessor and a flash memory. Said flash memory comprises an indexed area comprising indexed items, and an index structured in a plurality of index areas comprising a plurality of entries. Said flash memory comprises an index summary comprising a plurality of elements. Each index summary element is linked to an index area of said index. Said method comprises the step of updating an index summary element from all entries belonging to the index area linked to said index summary element by using k hash functions, with $1 \le k$.

The flash memory may be a NAND flash memory. The index summary elements may be built as Bloom filters.

Said system may have a volatile memory comprising a buffer area allocated to the index summary. Each element of the index summary may comprise m bits, with $m > 0$. Said method may comprise the further steps:

Sa) updating the index summary in the allocated buffer area,

Sb) when the allocated buffer area is full, splitting the allocated buffer area into a first group of P partitions with $1 \le P \le m$, so that the consecutive bits $E(((i-1) \times (m/p))+1)$ to $E(i \times (m/p))$ of every elements of the allocated buffer area belong to the $i^{th}$ partition, with $1 \le i \le m$ and where $E(n)$ is the higher integer $\le n$, Sc) allocating a dedicated flash memory page to each partition, Sd) flushing the allocated buffer area into the dedicated pages allocated to the partitions.

Each dedicated flash memory page may be divided into a plurality of sectors and said method may comprise the further step Sd1) of, transferring the allocated buffer area into sectors of said allocated dedicated flash memory pages during the flushing step Sd), when the allocated buffer area is full.

Said method may comprise the further step Se) of allocating an additional dedicated flash memory page to each said partition of the first group, when the allocated dedicated flash memory pages are full.

Said method may comprise the further steps:

Sf) when the dedicated flash memory pages allocated to partitions are full and the number of allocated flash memory pages reaches a predefined threshold t1, splitting each partitions of the first group in a second group of t1×p new partitions, Sg) allocating a dedicated flash memory page to each new partition of the second group, Sh) transferring content of every partitions of the first group into new partitions of the second group.

Said method may comprise the further steps:

Si) when the dedicated flash memory pages allocated to partitions of the first group are full and the number of flash memory pages allocated to the second group reaches a second predefined threshold t2, creating a third group of t3 new partitions, Sj) allocating a dedicated flash memory page to each new partition of the third group, Sk) transferring content of partitions belonging to both first and second groups into new partitions of the third group.

The second predefined threshold t2 may be equal to t1×p and the number t3 of partitions of the third group may be equal to 2×t2.

Each index summary element may comprise a set of q buckets of bits; with q≥P. Said method may comprise the further steps:

Sa1) applying a hash function h0 to all entries belonging to the index area linked to said element, Sa2) identifying a selected bucket according to the result of the hash function h0, Sa3) and updating only bits belonging to the selected bucket into said element during the updating step Sa).

Advantageously, said hash function h0 may be independent of the k hash functions used for building said element.

Indexed items and entries may be recorded in a sequential way respectively in the indexed area and in the index. The flash memory may have a delete area comprising a set of identifiers of the deleted indexed items.

Each indexed item may be a file record.

Another object of the invention is a method of managing indexation of memory in a system. Said system has a microprocessor and a flash memory. Said flash memory comprises an indexed area comprising indexed items, and an index structured in a plurality of index areas comprising a plurality of entries. Said flash memory comprises an index summary comprising a plurality of elements, each element of the index summary comprising m bits, with m>0. Each index summary element is linked to an index area of said index. Said method comprises the following steps:

So) applying k hash functions to a searched key to get k results re1, re2, . . . , rek, with 1≤k, Sp) initializing the search at the beginning of the index summary, Sq) scanning up the index summary to found the next index summary element having all bits set to 1 at positions re1, re2, . . . , rek, Sr) scanning up the index area linked to the found index summary element, Ss) if the searched key is not found at the step d), looping on step Sq).

Optionally, said system may have a volatile memory comprising a buffer area allocated to the index summary. Each element of the index summary may comprise m bits, with m>0. The allocated buffer area may be split into a first group of P partitions with 1≤P≤m. Each index summary element may comprise a set of q buckets of bits; with q≥P. Said method may comprise the further steps:

Sm) applying a hash function h0 to a searched key to get a result re0,

Sn) identifying the bucket corresponding to the computed result re0.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to indexation in any types of flash memory. In particular, it may apply to indexation of flash memory in an electronic token like a smart card, a USB token, or a mobile handset. In this specification, the electronic token is a smart card but it could be any other kind of portable device having a flash memory.

An advantage of the invention is to minimize the total number of reads and writes of flash pages incurred by data insertion. Thus the flash memory lifetime is increased and the power consumption is decreased.

Another advantage of the invention is to reduce the execution time during a search.

An additional advantage of the invention is to minimize the size of the part of flash memory which is used by the index. It makes the garbage collection needless or at least straightforward to implement.

Figure 1:
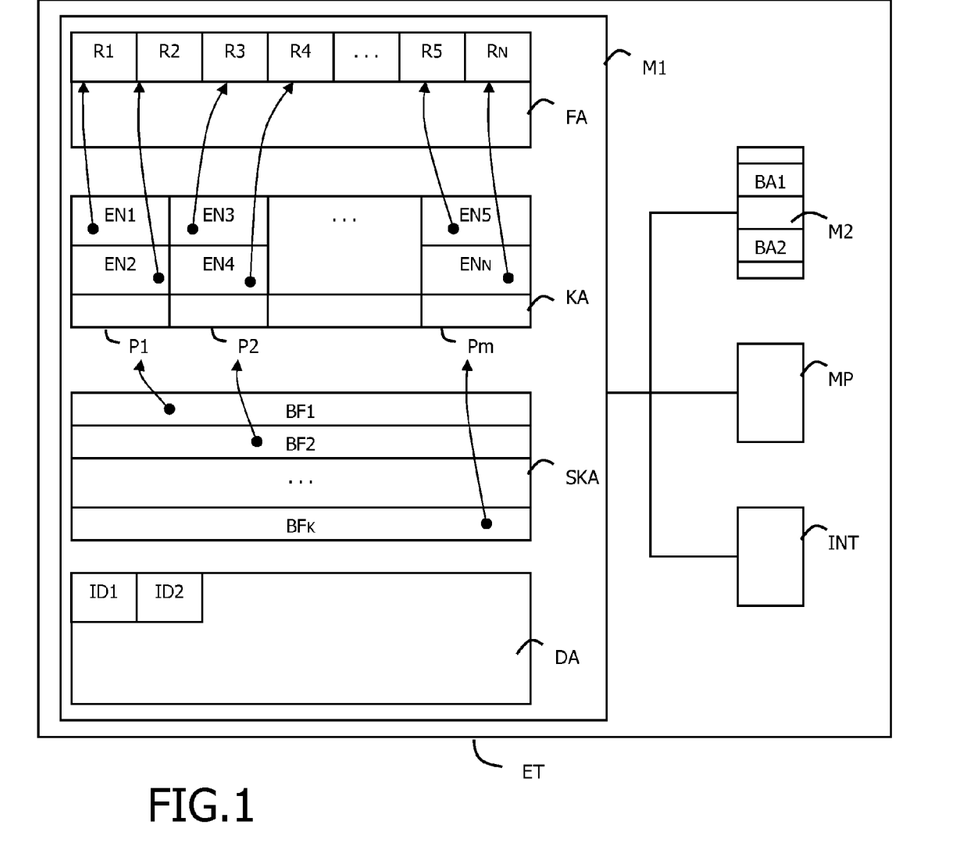
FIG. 1 depicts schematically the architecture of an electronic token of smart card type according to the invention.

FIG. 1 shows the architecture of a smart card as an example of an electronic token ET according to a preferred embodiment of the invention. The smart card ET contains a microprocessor MP, a communication interface INT, a first memory M1 and a second memory M2. The first memory M1 may be a NAND flash memory. Memory M1 contains an indexed area FA, an index KA, an index summary SKA and a delete area DA. The indexed area FA comprises indexed items R1, R2, R3, R4, R5 and Rn. For example, the indexed area FA may be a record file and indexed items R1 . . . Rn may be records.

The index KA is structured in a plurality of index areas P1, P2, Pm. Each index area comprises a plurality of entries EN1, EN2, EN3, EN4, EN5 and ENn. Each entry is linked to an indexed item. One flash memory page may be allocated to each index area. In the example of FIG. 1, entry EN1 is linked to indexed item R1, entry EN4 is linked to indexed item R4 and so on. Entries EN1 and EN2 belongs to the index area P1, entries EN3 and EN4 belongs to the index area P2 and entries EN5 and ENn belongs to the area Pm.

The index summary SKA comprises a plurality of elements BF1, BF2, BFk. Each element is linked to an index area. In the example of FIG. 1, index summary element BF1 is linked to index area P1, index summary element BF2 is linked to index area P2 and index summary element BFk is linked to index area Pm.

The delete area DA comprises a set of identifiers ID1 and ID2. Each identifier is linked to a deleted indexed item. For example identifier ID1 may be link to indexed items R3 and identifier ID2 may be link to indexed items R5. In this example, records R3 and R5 are supposed to be deleted and are supposed to be still present in the indexed file FA.

The second memory M2 is a RAM which contains first and second buffers BA1 and BA2.

In the described example, the records and index entries are managed in a pure sequential way. When a new record is inserted in file FA, it is simply added at the end of the indexed area FA. Then, a new index entry composed for example by a couple <key, pt> is added at the end of the index area KA, where <key> is the primary key of the inserted record and <pt> is the physical or logical address of the inserted record. If a record is deleted, its identifier is inserted at the end of the delete area DA but no update is performed neither in FA nor KA. An identifier may correspond to the physical or logical address of the deleted record. A record modification is implemented by a deletion of the targeted record followed by an insertion of a new record containing the new data.

An advantage of the invention is to allow a management of indexed items and index keys in a pure sequential way so that updates are not required for the pages where indexed items and index keys are stored. Thus the indexation method of the invention strongly differs from known indexation methods.

According to the invention, a summary of KA, called index summary SKA, is built in order to help identifying quickly the relevant index area of index KA which contains a searched key. The index summary SKA is different from a regular index because it does not provide any associative access. SKA is built sequentially and must be scanned sequentially. SKA summarizes each index area of KA by a dedicated element linked to each said index area.

Figure 5:
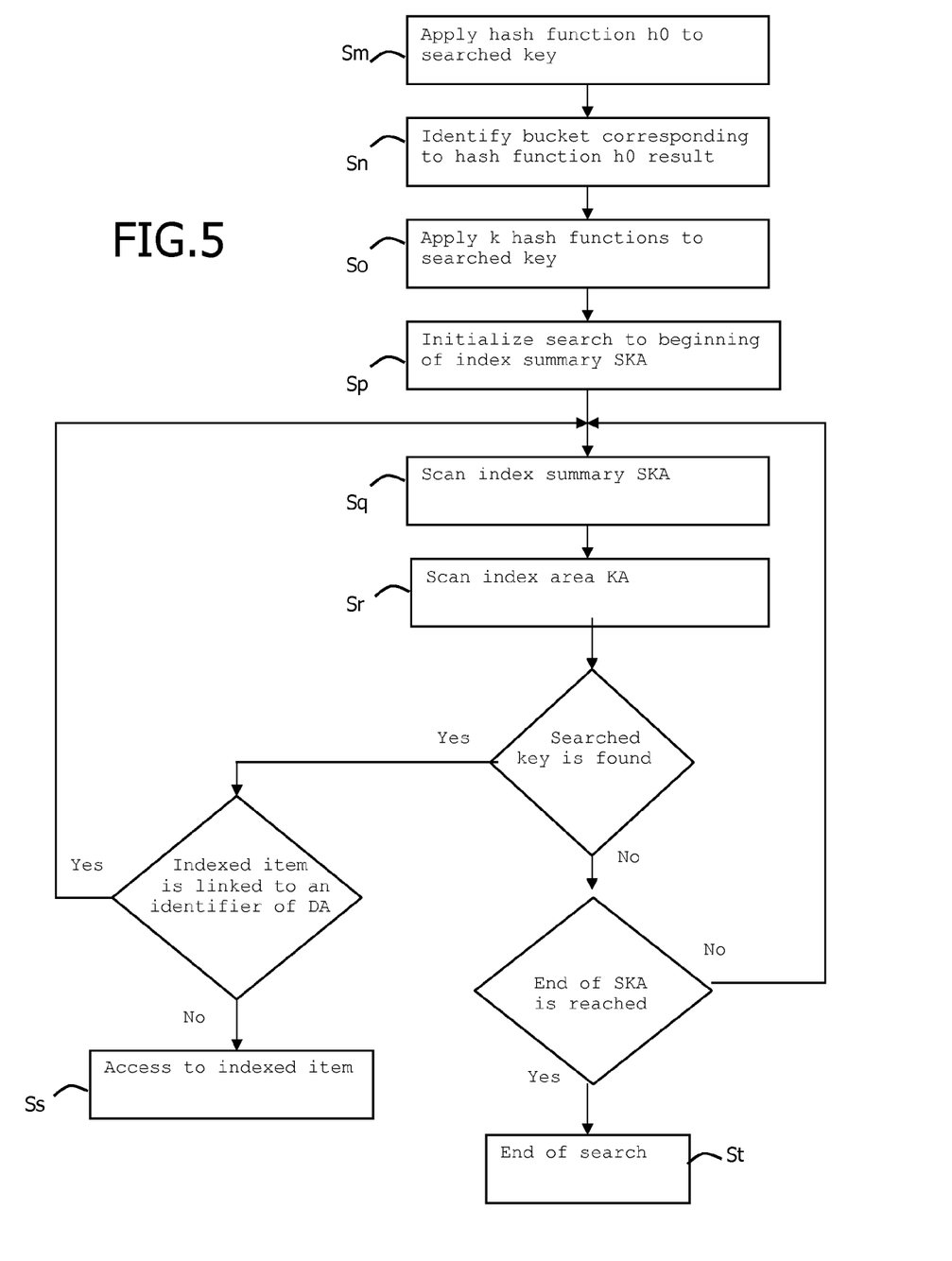
FIG. 5 is an algorithm for searching an item indexed according to the invention.

As described in FIG. 5, to search for a record by its key, the lookup operation first scans the index summary SKA during the step Sq for finding the relevant element. For example if the searched key corresponds to the element EN4, the found element should be BF2. Then the index area P2 linked to the found element BF2 is scanned in the index KA during step Sr. When the entry EN4 is found in index KA, the corresponding record R4 is identified. Then a search is performed to check that the found record R4 does not correspond to an identifier of the delete area DA. Since the found record R4 does not correspond to an identifier of the delete area DA, the record R4 is considered as valid and an access is performed to the relevant record R4 in file FA during step Ss. If the searched record is R3, the corresponding identifier ID1 is found in the delete area DA. The record R3 is considered as deleted and the search loops at step Sq. Then since no other record has a key equal to the key of record R3, no other key will be found and the search will stop at step St).

Elements of index summary SKA may be built with a Bloom filter structure. A Bloom filter is a compact data structure for representing a set A={a1, a2, ... an} of n elements to support membership queries. The Bloom filter idea is to allocate a vector v of m bits, initially all set to 0, and then choose k independent hash functions, $h_1, h_2, \ldots h_k$, each producing an integer in the range [1, m]. For each element a∈A, the bits at positions $h_1(a), h_2(a), \ldots, h_k(a)$ in v are set to 1. A particular bit might be set to 1 multiple times. A query for element b will check the bits at positions $h_1(b), h_2(b), \ldots, h_k(b)$. If any of them is 0, then b cannot be in A. Otherwise we conjecture that b is in A although there is a certain probability that this is wrong. This last situation is called a false positive. The parameters k and m can be tuned to make the probability f of false positives extremely low.

Figure 2:
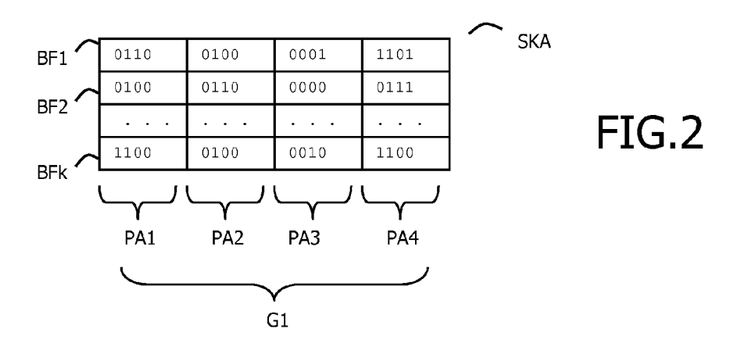
FIG. 2 depicts an example of the summary index structure according to the invention.

An example of content of such a index summary element is described in FIG. 2. For example BF2 element contains the 16 bits string "0100011000000111".

When a new record Rn is added in file FA, a new index entry ENn is added in the index KA. The new index entry ENn is placed in the index area Pm. Then the index summary element BFn is updated as a Bloom filter applying k hash functions to the new index entry ENn.

At lookup time, the searched key b is hashed with the k same hash functions during step So. Then the search is initialized at the beginning of the index summary SKA at step Sp. The SKA is then scanned up to get the first Bloom filter having all bits at positions $h_1(b), h_2(b), \ldots, h_k(b)$ set to 1 during step Sr. The associated index area of KA is directly accessed and the probability that it contains the expected index entry is high. For example probability is equal to 99% for k=4 and m=10×n. Otherwise, the scan continues in SKA to get the next Bloom filter having all bits at positions $h_1(b), h_2(b), \ldots, h_k(b)$ set to 1. The method loops until to found the searched key or to reach the end of SKA.

Alternatively Bloom filter may be built with all bits set at 1 by default and by setting bits at positions $h_1(b), h_2(b), \ldots, h_k(b)$ to 0.

Advantageously the index KA may be temporarily stored in a first buffer BA1 in RAM and index summary SKA may be temporarily stored in a second buffer BA2 in RAM.

An advantage of the invention is that the RAM required is independent of the size of the index with a lower bound equals to one page in RAM corresponding to a buffer BA2 for SKA and one sector in RAM corresponding to KA. Alternatively, the buffer in RAM corresponding to KA may be a buffer BA1 of one page.

Besides, key insertions are immediate in KA. They do not require traversing the index.

Moreover, the flash memory usage is near optimal considering that pages are neither updated nor moved and that the extra cost incurred by the index summary SKA is far less than the extra cost incurred by a B+Tree data structure. The index management of the invention reaches a near lower bound in terms of writes. The number k of hash functions used to build the Bloom filters can be tuned to increase the index summary SKA accuracy and then decrease the number of reads in index KA.

Advantageously each index summary element BF1 ... BFn is split into a first group G1 of P partitions, with 1≤P≤m, so that the consecutive bits $E(((i-1)\times(m/p))+1)$ to $E(i\times(m/p))$ of every index summary elements BF1, BF2, BFk belong to the $i^{th}$ partition, with 1≤i≤m and where E(n) is the higher integer ≤n. For example FIG. 2 shows an index summary SKA which is split into a first group G1 of 4 partitions PA1, PA2, PA3 and PA4.

Figure 4:
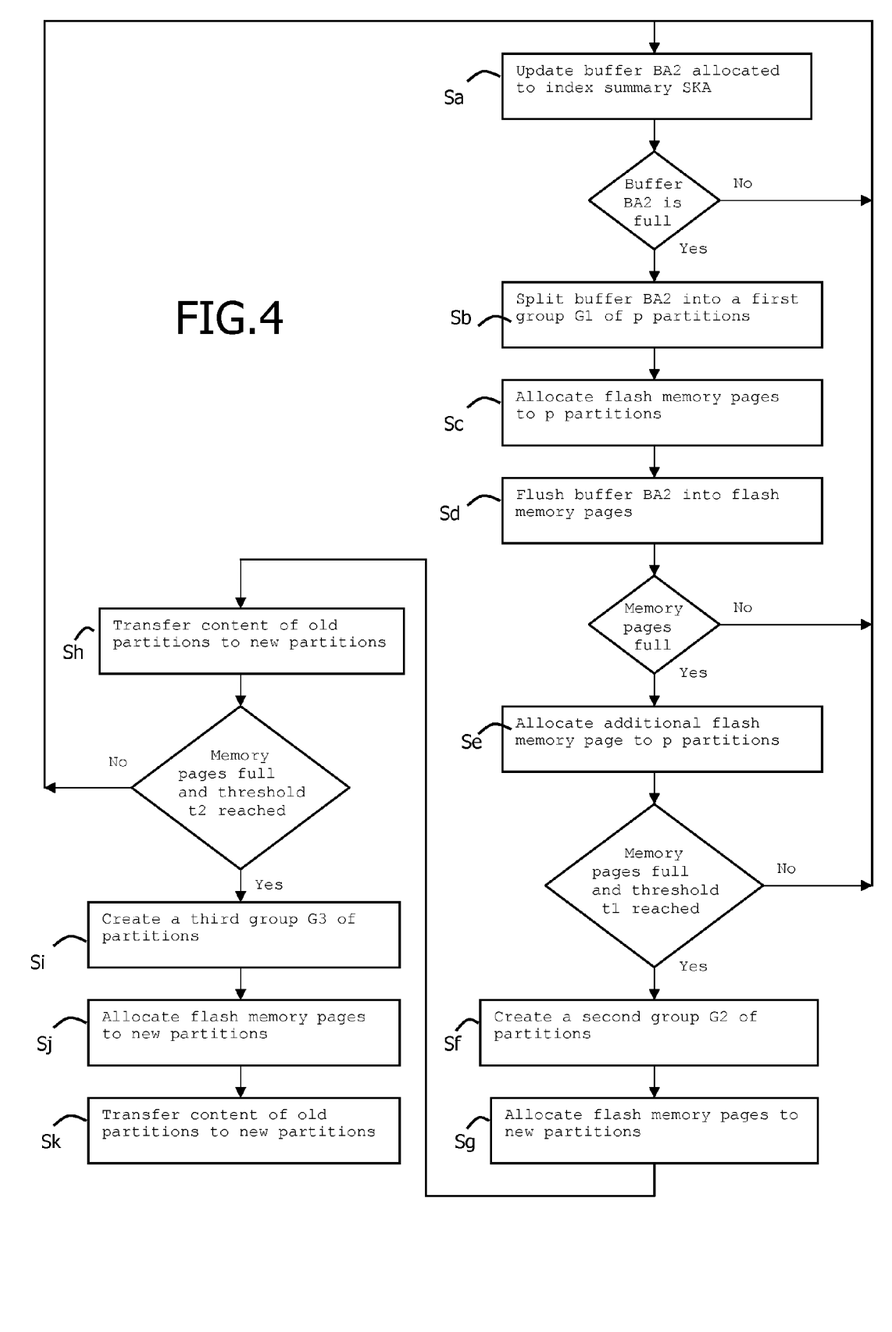
FIG. 4 is an algorithm for updating the memory index according to the invention.

In the example of FIG. 4, a RAM buffer BA2 is allocated to the index summary SKA. When a new data must be added in the SKA, the allocated buffer BA2 is updated during a step Sa. When the buffer BA2 is full in RAM and needs to be flushed on flash memory, it may be split into a first group G1 of partitions, during step Sb. Then at step Sc, one flash memory page is allocated to each partition. In a next step Sd, the buffer BA2 is flushed into flash memory pages allocated to partition of first group G1. When doing a lookup for key b, instead of reading all memory pages of SKA, only the SKA pages corresponding to the partitions containing bits $h_1(b), h_2(b), \ldots, h_k(b)$ need to be accessed. The benefit is a cost reduction of the lookup by a factor P/k.

In each partition, only one bit among m/P bits is of interest. Thus, while each page of the selected partitions needs to be loaded in the data register, only the bits of interest have to be read in RAM. By organizing the page storage so that the i$^{th}$ bit of the Bloom filters present in the same page are contiguous, a theoretical saving of a factor P/m can be reached on the loading cost. In practice, complete sectors have to be loaded in RAM to check error correction codes. Thus the real benefit is to load only ¼ of the data register in RAM. This is an important benefit since the loading of the data register in RAM represents 80% of the total page read cost.

Figure 3:
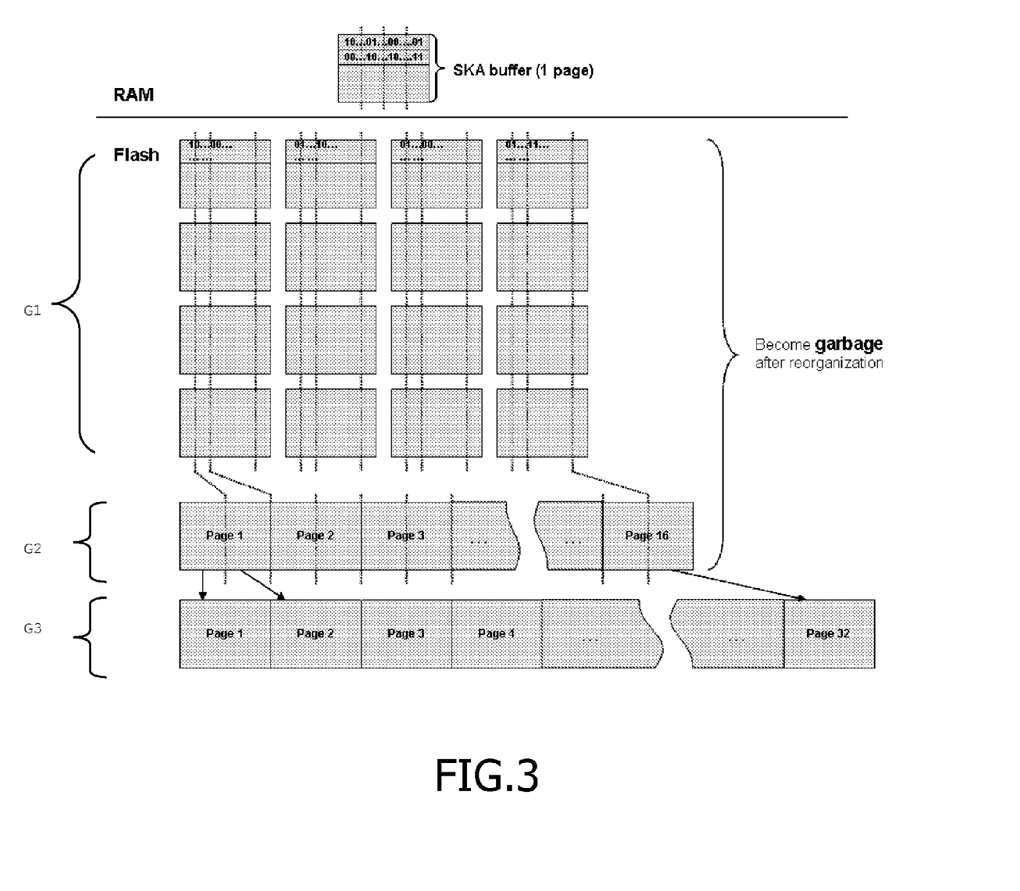
FIG. 3 is an example of the summary index split in partitions according to an alternative of the invention.

As illustrated in FIG. 3, when the RAM buffer allocated to SKA is less than P pages, the number of partitions may be dynamically increased. Generally the number of partitions should be equal to the number of sectors of a page. FIG. 3 shows a single RAM buffer BA2 of one page allocated to the index summary SKA. In this example, a flash memory page is divided into 4 sectors, the number of partitions of the first group is set to 4 and one flash page is initially allocated to each partition PA1, PA2, PA3 and PA4. The first time the BA2 buffer becomes full, each of its 4 sectors is flushed in the first sector of the first page of the corresponding partition. The second BA2 buffer flush will fill in the second sector of the first page of each partition and so on until the first page of each partition becomes full. Pages of partitions become full after 4 BA2 buffer flush. A second flash memory page is then allocated to each partition of the first group during step Se and the same process is repeated until each partition contains 4 pages. Alternatively, 4 flash memory pages may be allocated to each partition in one operation.

Partitions become full after 16 BA2 buffer flushes. At this time, allocated flash memory pages are full and a threshold t1 is reached. In the example of FIG. 3, threshold t1 is equal to 4, i.e. 4 pages are allocated to each of the 4 partitions of the first group. Then a second group G2 of partition is created during step Sf. At step Sg, one flash memory page is allocated to each new partition. The 4 partitions of the first group G1 are reorganized to form 16 partitions of a second group G2 of partitions. Data is transferred from the first group G1 of partitions to the second group G2 of partitions through read and write operations during step Sh. After another 16 SKA buffer flushes, a first group G1 of 4 partitions of 4 pages have been built again and are reorganized with the 16 partitions of the second group G2 to form a third group G3 of 32 partitions of 1 page and so on and so forth. A third group G3 of partition is created during step Si. At step Sj, one flash memory page is allocated to each new partition. Data is transferred from the first and second groups G1 and G2 to the third group G3 of partitions through read and write operations during step Sk. This solution is nothing but using the flash memory itself as a buffer to build a large number of partitions. This way of increasing the number of partitions takes full advantage of the possibility to write 4 sectors in the same page without erasing it. The use of partitions allows making the lookup cost almost constant whatever the size of the file is. Indeed, a lookup needs to consider only k partitions of one page each plus k partitions of the first group, the size of which vary from 1 to 4 pages.

After data have been transferred from a group to another group, pages of the old group are no longer valid and may be treated by the garbage mechanism in order to become available for further use.

Reclaiming the pages occupied by previous partitions that become no longer valid is straightforward because they contain only stale data and they can be reclaimed altogether.

Advantageously, a hashing step may be added before building the Bloom filters. As pictured in FIG. 5, each index summary element BF1 . . . BFk may be split into q buckets by a hash function h0, where q is chosen to be equal to or higher than the maximum number of partitions to be built. Results of the hash function h0 should belong to the range [1 . . . q]. In a preferred embodiment, this hash function h0 is independent of the k hash functions used for building the Bloom filters.

Each time an index entry is considered to compute the Bloom filter, h0 is applied first to determine the right bucket in step Sm. At step Sn, the bucket whose rank corresponds to the hash function h0 result is identified as the selected bucket. Then at step So, the k hash functions are computed to set the corresponding bits in the selected Bloom filter bucket. The benefit of this initial hashing with h0 is to guarantee that the bits of interest for a lookup always fall in the same partition. Then a lookup needs to consider only one partition of size between 1 to 4 pages belonging to the first group G1 plus one partition of one page belonging to another group. This improves the read behaviour by a factor of k at the expense of a small CPU overhead.

An additional advantage of the invention is to allow the tuning of parameters m and k in order to get the appropriate lookup performances according to hardware and software constraints.

The invention claimed is:

1. A system of managing indexation of memory, said system comprising:
   a microprocessor, and
   a flash memory including an indexed area containing indexed items, and an index structured in a plurality of index areas including a plurality of entries,
   wherein:
      said flash memory further includes an index summary containing a plurality of elements, each index summary element being linked to a respective index area of said index,
      each index summary element is built from all entries belonging to said linked index area and is built using k hash functions, where 1≤k, without overwriting existing data in said flash memory, and
      wherein each index area of the index includes a plurality of entries, and all of the entries within each index area are sequentially consecutive to each other, the entries are linked to respective indexed items, and are created without overwriting existing data in said flash memory,
   wherein each index summary element is a Bloom filter, and
   wherein each element of the index summary includes m bits, with m>0, and wherein the index summary is split into a first group of P partitions with 1<P≤m, so that the consecutive bits $E(((i-1)\times(m/p))+1)$ to $E(i\times(m/p))$ of every element of the index summary belong to the i$^{th}$ partition, with 1<i≤m.

2. The system according to claim 1, wherein the flash memory is a NAND flash memory.

3. The system according to claim 1, wherein each said partition is recorded in a set of memory pages, said set being exclusively allocated to said partition.

4. The system according to claim 1, wherein each index summary element includes a set of q buckets of bits, with q≥P, and wherein only bits belonging to a selected bucket are significant, the selected bucket being identified by the result of a hash function applied to all entries belonging to the index area linked to said element.

5. The system according to claim 1, wherein indexed items and entries are recorded in a sequential way respectively in the indexed area and in the index, and wherein the memory includes a delete area including a set of identifiers of the deleted indexed items.

6. The system according to claim 1, wherein each indexed item is a file record.

7. The system according to claim 1, wherein the system is an electronic token.

8. A method of managing indexation of memory in a system, said system having a microprocessor and a flash memory including an indexed area containing indexed items, and an index structured in a plurality of index areas including a plurality of entries, wherein:

said memory further includes an index summary containing a plurality of elements, each index summary element being linked to a respective index area of said index, said system has a volatile memory including a buffer area allocated to the index summary, wherein each element of the index summary includes m bits, with m>0, said index summary elements are built as Bloom filters, and said method comprises the following steps:

updating an index summary element from all entries belonging to the respective index area linked to said index summary element by using k hash functions, where 1≤k, without overwriting data in said flash memory, and wherein each index area of the index includes a plurality of entries, and all of the entries within each index area are sequentially consecutive to each other, the entries are linked to respective indexed items, and are created without overwriting existing data in said flash memory, Sa) updating the index summary in the allocated buffer area, Sb) when the allocated buffer area is full, splitting the allocated buffer area into a first group of P partitions with 1≤P≤m, so that the consecutive bits E(((i−1)×(m/p))+1) to E(i×(m/p)) of every elements of the allocated buffer area belong to the $i^{th}$ partition, with 1≤i≤m, Sc) allocating a dedicated flash memory page to each partition, and Sd) flushing the allocated buffer area into the dedicated pages allocated to the partitions.

9. The method according to claim 8, wherein the flash memory is a NAND flash memory.

10. The method according to claim 8, wherein each dedicated flash memory page is divided into a plurality of sectors, said method comprises the further step:

Sd1) when the allocated buffer area is full, transferring the allocated buffer area into sectors of said allocated dedicated flash memory pages during the flushing step Sd).

11. The method according to claim 10, said method comprises the further step:

Se) when the allocated dedicated flash memory pages are full, allocating an additional dedicated flash memory page to each said partition of the first group.

12. The method according to claim 11, said method comprises the further steps:

Sf) when the dedicated flash memory pages allocated to partitions are full and the number of allocated flash memory pages reaches a predefined threshold t1, splitting each partitions of the first group in a second group of t1×p new partitions, Sg) allocating a dedicated flash memory page to each new partition of the second group, and Sh) transferring content of every partitions of the first group into new partitions of the second group.

13. The method according to claim 12, said method comprises the further steps:

Si) when the dedicated flash memory pages allocated to partitions of the first group are full and the number of flash memory pages allocated to the second group reaches a second predefined threshold t2, creating a third group of t3 new partitions, Sj) allocating a dedicated flash memory page to each new partition of the third group, and Sk) transferring content of partitions belonging to both first and second groups into new partitions of the third group.

14. The method according to claim 13, wherein the second predefined threshold t2 is equal to t1×p and the number t3 of partitions of the third group is equal to 2×t2.

15. The method according to claim 11, wherein each index summary element includes a set of q buckets of bits, with q≥P, said method comprises the further steps:

Sa1) applying a hash function h0 to all entries belonging to the index area linked to said element, Sa2) identifying a selected bucket according to the result of the hash function h0, and Sa3) and updating only bits belonging to the selected bucket into said element during the updating step Sa).

16. The method according to claim 15, wherein said hash function h0 is independent of the k hash functions used for building said element.

17. The method according to claim 8, wherein indexed items and entries are recorded in a sequential way respectively in the indexed area and in the index, and wherein the memory includes a delete area including a set of identifiers of the deleted indexed items.

18. The method according to claim 8, wherein each indexed item is a file record.

19. A method of managing indexation of memory in a system, said system having a microprocessor and a flash memory including an indexed area containing indexed items, and an index structured in a plurality of index areas including a plurality of entries, each index area of the index includes a plurality of entries, and all of the entries within each index area are sequentially consecutive to each other, the entries are linked to respective indexed items, wherein:

said memory includes an index summary containing a plurality of elements, each element of the index summary including m bits, with m>0, each index summary element being linked to a respective index area of said index, and said method comprises the following steps:

So) applying k hash functions to a searched key to get k results re1, re2, . . . , rek, with 1≤k, Sp) initializing the search at the beginning of the index summary, Sq) scanning up the index summary to found the next index summary element having all bits set to 1 at positions re1, re2, . . . , rek, Sr) scanning up the index area linked to the found index summary element, Ss) if the searched key is not found at the step Sr), looping on step Sq), wherein each index summary element is a Bloom filter, and wherein the index summary is split into a first group of P partitions with 1<P≤m, so that the consecutive bits E(((i−1)×(m/p))+1) to E(i×(m/p)) of every element of the index summary belong to the partition, with 1<i≤m.

20. The method according to claim 19, wherein said system has a volatile memory including a buffer area allocated to the index summary, wherein each element of the index summary includes m bits, with m>0, wherein the allocated buffer area is split into a first group of P partitions with 1≤P≤m, and wherein each index summary element includes a set of q buckets of bits, with q≥P, said method comprising the further steps:

Sm) applying a hash function h0 to a searched key to get a result re0, and

Sn) identifying the bucket corresponding to the computed result re0.

* * * * *